Patented Jan. 2, 1923.

1,440,963

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCTS OBTAINED THEREBY.

No Drawing. Original application filed April 1, 1922, Serial No. 548,826. Divided and this application filed April 1, 1922. Serial No. 548,827.

*To all whom it may concern:*

Be it known that I, SIDNEY M. CADWELL, a citizen of the United States, residing at Leonia, county of Bergen, and State of New Jersey, have invented certain new and useful Improvements in Processes for Vulcanizing Rubber and Products Obtained Thereby, of which the following is a full, clear, and exact description.

This invention relates to vulcanizing rubber and similar materials and products obtained thereby, being more particularly directed to acceleration of vulcanization by a class of organic accelerators and products resulting from such vulcanization.

This case is a division of application Serial No. 548,826 filed April 1, 1922.

One object of the invention is to provide a process of the kind mentioned employing accelerators obtainable from inexpensive raw materials by a simple method. Another object of the invention is to provide a process in which accelerators of the kind mentioned may be readily compounded with rubber, or similar material, which shall permit of the carrying out of vulcanization at ordinary temperatures, in masses of rubber or in thin sheets, while avoiding the generation of acids during the process of vulcanization, as, for example, takes place when sulphur chloride is used. Another object is to provide a series of products having generally desirable physical characteristics, such as high tensile strength, resistance to ageing, resistance to flexing, etc., and which shall be substantially free from the odor of the vulvanizing ingredients employed. Other objects will in part be obvious and in part pointed out hereinafter.

The invention accordingly consists broadly in the process, and product obtained therefrom, for treating rubber and similar materials, which comprises subjecting the rubber to a vulcanizing agent and a substance containing the radical $$\underset{X}{\overset{\parallel}{\text{RCSM,}}}$$

and vulcanizing the rubber. In this formula, R represents any element subject to the limitation mentioned hereinafter; M represents a salt-forming element or group or hydrogen, such as zinc, ammonium, etc., and is designated as representing a metal or being metallic, or a radical $$\underset{X}{\overset{\parallel}{\text{SCR}}}$$

or a radical $$\underset{X}{\overset{\parallel}{\text{CR}}}$$

and X represents any bivalent element or radical, such as sulphur, oxygen, etc., subject to the limitation mentioned later.

It will be seen that the substances containing the radical fall into three groups corresponding to the three said significations of M. In the first two groups the symbol R in $$\underset{X}{\overset{\parallel}{\text{RCSM}}}$$

is limited to any element except nitrogen; in the third group where M represents $$\underset{X}{\overset{\parallel}{\text{CR}}}$$

this limitation is absent. In the table herein shown forming part of the specification, there is shown the broad group containing the radical $$\underset{X}{\overset{\parallel}{\text{RCSM}}}$$

sub-divided into three smaller groups which are respectively

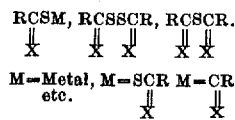

M=Metal, M=SCR M=CR etc.

It will be noted that the group formulæ represent generally derivatives of carbon oxysulphide or carbon disulphide.

The formulæ of the first two groups mentioned, in which the first symbol R is any element except nitrogen, may be written

under which fall

where M is the metal and thiol salts are included, and

where M is equal to

and the disulphides are represented. R' in these formulæ designates any element except nitrogen.

In employing the first group of those mentioned above including substances having the formula

it has been found that M preferably represents either zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state, so that the preferred formula for the thiol salts is

where M' represents one of the preferred metals given. M' may be substituted by any metal provided that one of the metals just mentioned is present in the combination either at some other position in the formula including

or be introduced otherwise than as part of this compound. Where an amine is present or in vulcanization below the normal hot vulcanization temperatures, say at ordinary temperatures (70° F. approximately), X represents any bivalent element or radical. For hot vulcanization where R represents oxygen, X is preferably any bivalent substance except sulphur. In connection with the other groups mentioned, namely, those represented by the formulæ

and

constituting respectively the disulphide and monosulphide groups, the presence of zinc or mercury in the mercuric state is preferable when vulcanization at ordinary temperatures is carried out. When vulcanization above ordinary temperatures is carried out the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state. As noted in connection with the first group, the metals employed with groups two and three may be present in any combined form.

In the table mentioned above, R and X are shown as represented by carbon, oxygen, nitrogen and sulphur, which are four of the more important elements occuring in organic compounds.

It will be understood that the invention is not limited to the species shown in the accompanying table, and that by substituting other elements than nitrogen, carbon, oxygen and sulphur for the symbol R or X, various other species may be formulated falling within the scope of the invention.

Although the various species disclosed are represented as symmetrical, it will be understood that unsymmetrical species also fall within the limits of the invention.

The table is:

1,440,963

| RCSM $\overset{\parallel}{\underset{X}{}}$ | | | | | | | | | | | | |
|---|---|---|---|---|---|---|---|---|---|---|---|---|

Group I.

R'CSM $\overset{\parallel}{\underset{X}{}}$ M Metal Thiol salts

| 1. OCSM $\overset{\parallel}{\underset{S}{}}$ | 2. OCSM $\overset{\parallel}{\underset{O}{}}$ | 3. OCSM $\overset{\parallel}{\underset{NR}{}}$ | 4. OCSM $\overset{\parallel}{\underset{CH_2}{}}$ |
|---|---|---|---|
| 5. CCSM $\overset{\parallel}{\underset{S}{}}$ | 6. CCSM $\overset{\parallel}{\underset{O}{}}$ | 7. CCSM $\overset{\parallel}{\underset{NR}{}}$ | 8. CCSM $\overset{\parallel}{\underset{CH_2}{}}$ |
| 9. SCSM $\overset{\parallel}{\underset{S}{}}$ | 10. SCSM $\overset{\parallel}{\underset{O}{}}$ | 11. SCSM $\overset{\parallel}{\underset{NR}{}}$ | 12. SCSM $\overset{\parallel}{\underset{CH_2}{}}$ |
| 13. NCSM $\overset{\parallel}{\underset{S}{}}$ | 14. NCSM $\overset{\parallel}{\underset{O}{}}$ | 15. NCSM $\overset{\parallel}{\underset{NR}{}}$ | 16. NCSM $\overset{\parallel}{\underset{CH_2}{}}$ |

Group II.

R'CSSCR $\overset{\parallel}{\underset{X}{}}\overset{\parallel}{\underset{X}{}}$ M=SCR $\overset{\parallel}{\underset{X}{}}$ Disulphides.

| 17. OCSSCO $\overset{\parallel}{\underset{S}{}}\overset{\parallel}{\underset{S}{}}$ | 18. OCSSCO $\overset{\parallel}{\underset{O}{}}\overset{\parallel}{\underset{O}{}}$ | 19. OCSSCO $\overset{\parallel}{\underset{NR}{}}\overset{\parallel}{\underset{NR}{}}$ | 20. OCSSCO $\overset{\parallel}{\underset{CH_2}{}}\overset{\parallel}{\underset{CH_2}{}}$ |
|---|---|---|---|
| 21. CCSSCC $\overset{\parallel}{\underset{S}{}}\overset{\parallel}{\underset{S}{}}$ | 22. CCSSCC $\overset{\parallel}{\underset{O}{}}\overset{\parallel}{\underset{O}{}}$ | 23. CCSSCC $\overset{\parallel}{\underset{NR}{}}\overset{\parallel}{\underset{NR}{}}$ | 24. CCSSCC $\overset{\parallel}{\underset{CH_2}{}}\overset{\parallel}{\underset{CH_2}{}}$ |
| 25. SCSSCS $\overset{\parallel}{\underset{S}{}}\overset{\parallel}{\underset{S}{}}$ | 26. SCSSCS $\overset{\parallel}{\underset{O}{}}\overset{\parallel}{\underset{O}{}}$ | 27. SCSSCS $\overset{\parallel}{\underset{NR}{}}\overset{\parallel}{\underset{NR}{}}$ | 28. SCSSCS $\overset{\parallel}{\underset{CH_2}{}}\overset{\parallel}{\underset{CH_2}{}}$ |
| 29. NCSSCN $\overset{\parallel}{\underset{S}{}}$ | 30. NCSSCN $\overset{\parallel}{\underset{O}{}}$ | 31. NCSSCN $\overset{\parallel}{\underset{NR}{}}\overset{\parallel}{\underset{NR}{}}$ | 32. NCSSCN $\overset{\parallel}{\underset{CH_2}{}}\overset{\parallel}{\underset{CH_2}{}}$ |

Group III.

RCSCR $\overset{\parallel}{\underset{X}{}}\overset{\parallel}{\underset{X}{}}$ M=CR $\overset{\parallel}{\underset{X}{}}$ Monosulphides.

| 33. OCSCO $\overset{\parallel}{\underset{S}{}}\overset{\parallel}{\underset{S}{}}$ | 34. OCSCO $\overset{\parallel}{\underset{O}{}}\overset{\parallel}{\underset{O}{}}$ | 35. OCSCO $\overset{\parallel}{\underset{NR}{}}\overset{\parallel}{\underset{NR}{}}$ | 36. OCSCO $\overset{\parallel}{\underset{CH_2}{}}\overset{\parallel}{\underset{CH_2}{}}$ |
|---|---|---|---|
| 37. CCSCC $\overset{\parallel}{\underset{S}{}}\overset{\parallel}{\underset{S}{}}$ | 38. CCSCC $\overset{\parallel}{\underset{O}{}}\overset{\parallel}{\underset{O}{}}$ | 39. CCSCC $\overset{\parallel}{\underset{NR}{}}\overset{\parallel}{\underset{NR}{}}$ | 40. CCSCC $\overset{\parallel}{\underset{CH_2}{}}\overset{\parallel}{\underset{CH_2}{}}$ |
| 41. SCSCS $\overset{\parallel}{\underset{S}{}}\overset{\parallel}{\underset{S}{}}$ | 42. SCSCS $\overset{\parallel}{\underset{O}{}}\overset{\parallel}{\underset{O}{}}$ | 43. SCSCS $\overset{\parallel}{\underset{NR}{}}\overset{\parallel}{\underset{NR}{}}$ | 44. SCSCS $\overset{\parallel}{\underset{CH_2}{}}\overset{\parallel}{\underset{CH_2}{}}$ |
| 45. NCSCN $\overset{\parallel}{\underset{S}{}}$ | 46. NCSCN $\overset{\parallel}{\underset{O}{}}$ | 47. NCSCN $\overset{\parallel}{\underset{NR}{}}\overset{\parallel}{\underset{NR}{}}$ | 48. NCSCN $\overset{\parallel}{\underset{CH_2}{}}\overset{\parallel}{\underset{CH_2}{}}$ |

Group I.

M Metal
Thiol salts

In general, it is to be noted in connection with this group, that its members are able to accelerate both hot vulcanization, that is vulcanization at or above 240° F., and vulcanization below such temperatures, and that they may be used for such vulcanization in thick masses of rubber, in thin sheets, or in cements.

The general procedure for vulcanizing employing members of this group is as follows:—100 parts of rubber, 10 parts zinc oxide, 3 parts of sulphur, and 0.1–3.0 parts of accelerator are mixed. If vulcanization is employed the usual temperatures or lower may be used for periods of thirty minutes or more to complete vulcanization. The normal or usual temperatures for hot vulcanization are 240° F. or above. If cold vulcanization with heat is desired the mixed materials may be allowed to stand at ordinary room temperature for a week or less, when vulcanization is complete. The procedure given above may be employed with thin or thick masses of rubber, and in the case of cements where a solvent is used with the mixture, the procedure after mixing and evaporation of the solvent, is substantially identical with that employed for thin masses of rubber. The use of materials of this group, in the manner indicated above, will secure cold vulcanization without added bases or amines, but if such bases or amines are added, the vulcanization is accelerated.

The action of the addition of amines to materials of this class has been found to be as follows:—The acceleration by aliphatic amines is greatest when approximately a half molecular weight of the amine on the basis of the carbon disulphide content of the thiol salt is used. An excess of primary aliphatic amine retards the cure considerably. An excess of secondary aliphatic amine retards the cure less and an excess of tertiary aliphatic amine has practically no retarding effect. The greater the amount of primary aromatic amine added the greater the acceleration. Dibenzyl amine has given excellent results in the acceleration of vulcanization according to the invention. Aniline has also given good results. Bases such as sodium hydroxide also accelerate the action of thiol salts.

The thiol salts are particularly adapted to be used in connection with cold curing and cements. It will be understood of course as pointed out above that they may be used in hot vulcanization and otherwise as desired. The members of the group are preferably employed with substances containing combined zinc preferably zinc oxide, or one of the metals in combination hereinbefore enumerated. The oxides are generally designated at M'O.

Species 1.

As a specific embodiment of one of the members of this group which when employed in a process constituting the invention has provided good results, the following example is cited:—100 parts of rubber, 10 parts of zinc oxide, 4 parts of zinc butyl xanthogenate, 1 part of sulphur, and two (2) parts paratoluidine, are mixed by milling in the usual way. The mixture is milled or sheeted or formed in any other way and the material so treated is allowed to stand for several days. Vulcanization is then completed at ordinary temperature without the application of heat. A convenient method for vulcanization at temperatures below 240° F. consists in exposing the above mixture, milled, sheeted, or formed in any other way desired, to a temperature of approximately 170° F. for 60 minutes, whereupon satisfactory vulcanization is secured. It will be observed that a base, paratoluidine, has been employed here. Such a base, particularly an amine accelerates the vulcanization process, employing the various members of this species, even more rapidly, although if omitted vulcanization will take place at ordinary temperatures. A convenient method for forming molded goods is to heat the rubber compounded with a member of this species for a short period in the mold, and then allow vulcanization to proceed at ordinary temperatures.

In employing material of this species with cement, the following procedure may be carried out:—100 parts of rubber, 10 parts zinc oxide, 6 parts of zinc butyl xanthogenate, are made into a cement with 800 parts of benzol; and 100 parts of rubber, 10 parts of zinc oxide, 6 parts of sulphur and 6 parts of paratoluidine are made into cement with 800 parts of benzol. Neither one of these cements will vulcanize at ordinary temperatures on standing for several months, but if mixed in equal proportions the mixed cement or the dried rubber therefrom will vulcan e in from 24 to 48 hours in ordinary room temperature. If high temperatures are employed vulcanization proceeds more quickly.

Zinc butyl xanthogenate is prepared as follows: 20 lbs. potassium hydroxide sticks are dissolved in a minimum amount of hot water. The solution is cooled and placed in a cool tub, and 6000 cc. carbon disulphide and 7000 cc. butyl alcohol are slowly added with stirring and cooling. Heat is evolved and the reaction mixture takes on a red color. It is cooled and filtered and the residue which is believed to be potassium butyl xanthogenate is recrystallized from a small amount of water. 200 grams of this potassium butyl xanthogenate are dissolved in a litre of water and added to 200 grams of zinc sulphate dissolved in a litre of water. The precipitate which forms is believed to be zinc butyl xanthogenate. It is filtered out and dried at ordinary temperature. The zinc butyl xanthogenate as thus prepared usually contains a small amount of zinc oxide, but it may be purified until only a small per cent zinc oxide remains. Among its properties may be mentioned the following: It decomposes in the presence of amines and alkalies. It is a white powder; it is soluble in about 10 parts benzol, soluble in about 8 parts chloroform, somewhat soluble in carbon tetrachloride, slightly soluble in gasoline or ligroin.

In general, members of this species operate advantageously where the zinc or similar combined metal is present. Where zinc oxide is used reduction in its proportions will produce transparent stocks.

Other members of this species falling under the general formula given are:—
butyl xanthogenate of potassium, sodium, barium, magnesium, calcium, ammonium, iron, lead, etc.

Other members of this species are:—

Barium ethylxanthogenate $$\underset{S\quad\ S}{C_2H_5OCSBa3COC_2H_5}$$

Sodium methylxanthogenate $$\underset{S}{CH_3OCSNa}$$

Lead methylxanthogenate $$\underset{S\quad\ S}{CH_3OCSPbSCOCH_3}$$

Zinc methylxanthogenate $$\underset{S\quad\ S}{CH_3OCSZnSCOCH_3}$$

Lithium ethylxanthogenate $$\underset{S}{C_2H_5OCSLi}$$

Magnesium ethylxanthogenate $$\underset{S\quad\ S}{C_2H_5OCSMgSCOC_2H_5}$$

Calcium ethylxanthogenate $$\underset{S\quad\ S}{C_2H_5OCSCaSCOC_2H_5}$$

Ammonium ethylxanthogenate $$\underset{S}{C_2H_5OCSNH_4}$$

Potassium ethylxanthogenate $$\underset{S}{C_2H_5OCSK}$$

Sodium ethylxanthogenate $$\underset{S}{C_2H_5OCSNa}$$

Ferric ethylxanthogenate $$\underset{S}{C_2H_5OCSFe_3}$$

Lead ethylxanthogenate $$\underset{S\quad\ S}{C_2H_5OCSPbSCOC_2H_5}$$

Mercuric ethylxanthogenate $$\underset{S\quad\ S}{C_2H_5OCSHgSCOC_2H_5}$$

Potassium amylxanthogenate $$\underset{S}{C_5H_{11}OCSK}$$

Zinc amylxanthogenate $$\underset{S\quad\ S}{C_5H_{11}OCSZnSCOH_{11}C_5}$$

Zinc ethylxanthogenate $$\underset{S\quad\ S}{C_2H_5OCSZnSCOH_5C_2}$$

*Species 2.*

$$\underset{O}{OCSM}$$

The following members of this species have been employed to give good results in connection with the process included in the invention:—

$$\underset{O}{C_2H_5OC-SK}$$

Ethyloxyester of potassium thiolcarbonate $$\underset{O}{C_4H_9OC-SK}$$

Butyloxyester of potassium thiolcarbonate

*Species 3.*

$$\underset{NR}{OCSM}$$

The following members of this species have been employed to give good results in connection with the process included in the invention Ethyl ester of allyl thiocarbamic acid $$\begin{array}{c}CH_2=CH-CH_2NH\\|\\C=S\\|\\C_2H_5O\end{array}$$

Ethyl ester of phenylthiocarbamic acid $$\begin{array}{c}C_6H_5NH\\|\\C=S\\|\\C_2H_5O\end{array}$$

Butyl ester phenylthiocarbamic acid

Species 5.

The following members of this species have been employed to give good results in connection with the process included in the invention:

Lead dithiophenylacetate

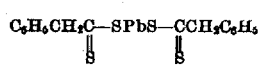

or
Lead dithiobenzoate

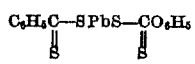

or
Zinc dithiobenzoate

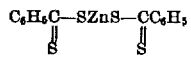

or
Cadmium dithiobenzoate

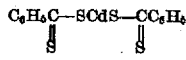

or
Mercurous dithiobenzoate

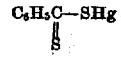

or
Cupric dithiobenzoate

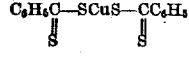

or
Potassium dithiobenzoate

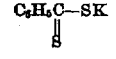

or
Lead dithioacetate

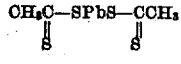

or
Lead dithiobrombenzoate

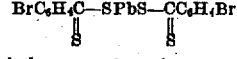

Zinc dithiobenzoate is preferably employed as follows: 100 parts of rubber are mixed with 10 parts zinc oxide, three parts sulphur, and $\frac{1}{10}$ part zinc dithiobenzoate, and vulcanization is accomplished in a mold under 40 lbs. steam pressure for 30 minutes.

Species 6.

The following members of this species have been employed to give good results in connection with the process included in the invention:

Lead thiobenzoate

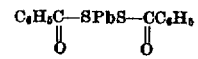

Potassium thioacetate

Lead thiobutrate

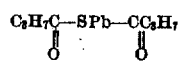

Species 7.

The following members of this species have been employed to give good results in connection with the process included in the invention:—

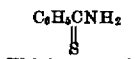
Thiobenzamide.
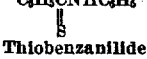
Thiobenzanilide.

Species 9.

The following members of this species have been employed to give good results in connection with the process included in the invention:—

Cobalto ammonium trithiocarbonate.
K. A. Hoffman & Hochtlen Berichte 36, 1146 (1903).
Cuproammoniumtrithiocarbonate (same ref.)
Potassium trithiocarbonate.
Ca(OH)₂CaCS₃
Basic calcium trithiocarbonate.

Species 10.

The following member of this species has been employed to give good results in connection with the process included in this invention:—

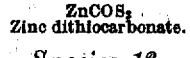
Zinc dithiocarbonate.

Species 13.

The members of this class include:

Potassium orthomethylphenylenedithiocarbamate o-CH₂C₆H₄NH.C—S—K
‖
S

Ammonium para-aminophenylenedithiocarbamate p-NH₂C₆H₄NHC—SNH₄
‖
S

Ammonium phenylethyldithiocarbamate

C₆H₅\
         N—C—SNH₄
C₂H₅/  ‖
          S

Potassium para-aminophenylenedithiocarbamate p-NH₂C₆H₄NH—C—SK
‖
S

Zinc para-aminophenylenedithiocarbamate p-NH₂C₆H₄NHC—S—Zn—S—CNHC₆H₄NH₂-p
‖
S

Zinc ethylphenyldithiocarbamate

C₆H₅\              /C₆H₅
         NCSZnSCN
C₂H₅/              \C₂H₅

Ammonium benzidyldithiocarbamate

H₂NC₆H₄C₆H₄NHC—S—NH₄
‖
S

Ammonium phenyldithiocarbamate

C₆H₅NHC—SNH₄
‖
S

Zinc phenylaminodithiocarbamate

C₆H₅NHNHC—SZn—S—C—NHNHC₆H₅
‖
S

Zinc alphanapthyldithiocarbamate a-C₁₀H₇NHC—S—Zn—S—CNHC₁₀H₇-a
‖
S

Paramethylphenyleneammonium paramethylphenylenedithiocarbamate p-CH₃C₆H₄NHC—SH₃NC₆H₄CH₃-p
‖
S Ammonium metamethylaminophenyldithiocarbamate

CH₃\
        C₆H₃NHC—S—NH₄
NH₂/     ‖
            S

Zinc metadiaminomethylphenyldithiocarbamate:

NH₂\                                          /NH₂
CH₃—C₆H₂NHC—SZn—S—CNH.H₂C—CH₃
NH₂/     ‖                ‖                \NH₂
           S                  S

Ammonium paranitrophenylenedithiocarbamate p-NO₂C₆H₄NHC—SNH₄
‖
S

Ammonium paramethylphenylenedithiocarbamate p-CH₃C₆H₄NHC—SNH₄
‖
S

Zinc paramethylphenylenedithiocarbamate p-CH₃C₆H₄NHC—SZnSCNHC₆H₄CH₃-p
‖       ‖
S       S Ammonium orthomethylphenylenedithiocarbamate o-CH₃C₆H₄NHC—SNH₄
‖
S Zinc phenylethylthiocarbamate C₆H₅\                              /C₆H₅
         N—C—S—Zn—S—C—N
C₂H₅/    ‖                   ‖       \CH₃
            S                    S Zinc phenylmethyldithiocarbamate C₆H₅\                              /C₆H₅
         NC—S—Zn—S—C—N
CH₃/    ‖                   ‖       \C₂H₃
            S                    S Stannous paramethylphenylenedithiocarbamate p.CH₃C₆H₄NHC—SSn₂
‖
S Iron phenyldithiocarbamate C₆H₅NHC—SFe₃
‖
S Zinc phenyldithiocarbamate C₆H₅NHC—S—Zn₂
‖
S Iron ethylphenyldithiocarbamate C₆H₅\
         NC—SFe₃
C₂H₅/  ‖
          S Barium ethylphenyldithiocarbamate C₆H₅\
         NC—SBa₂
C₂H₅/  ‖
          S Calcium ethylphenyldithiocarbamate C₆H₅\
         NC—S—Ca₂
C₂H₅/  ‖
          S Para aminophenyleneammonium para-aminophenylenedithiocarbamate p-NH₂C₆H₄NHC—SH₃NC₆H₄NH₂-p
‖
S Barium orthomethylphenylenedithiocarbamate (o)CH₃C₆H₄NHC—S—Ba—SCNHC₆H₄CH₃(o)
‖                                 ‖
S                                 S Zinc orthomethylphenylenedithiocarbamate (o)CH₃C₆H₄NHC—S—ZnSCNHC₆H₄CH₃(o)
‖                           ‖
S                           S Ferric paramethylphenylenedithiocarbamate p.CH₃C₆H₄NHC—SFe₃
‖
S Barium paramethylphenylenedithiocarbamate

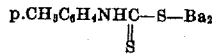

Calcium paramethylphenylenedithiocarbamate

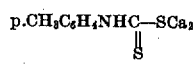

Magnesium orthomethylphenylenedithiocarbamate

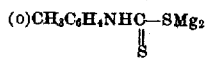

Copper ethylphenyldithiocarbamate

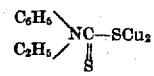

Zinc methylphenyldithiocarbamate

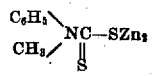

*Species 14.*

The following member of this species has been employed to give good results in connection with the process included in this invention:—

Zinc diethylthiocarbamate

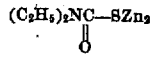

*Species 15.*

The following members of this species have been employed to give good results in connection with the process included in this invention:—

Ethylphenylthiourea

Dimethylphenylthiourea

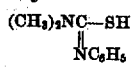

It will be understood that the invention disclosed in co-pending application Serial No. 441,691, filed February 1, 1921, may be employed in connection with the accelerators disclosed and included in the invention of the present application.

It is to be understood that rubber substitutes synthetic rubber, balata, gutta percha, etc., may be similarly treated instead of rubber and it is intended to cover such processes in the claims.

In general the accelerators included in Group I given above are obtainable from inexpensive raw materials by simple methods. The members of the group may be readily compounded with rubber or similar material and may be employed generally in vulcanization in thin or thick masses of rubber or in cements. It will be particularly noted that the members of Group I are able to accelerate vulcanization at temperatures below the normal vulcanizing temperature, for instance at ordinary room temperature. The ability to vulcanize at such temperature varies somewhat in accordance with the species selected.

The products obtained provide in general desirable physical characteristics, such as high tensile strength, resistance to ageing, resistance to flexing, etc., and in general are free from the odor of vulcanizing ingredients. It will thus be seen that among others the objects of the invention above enumerated are achieved.

As many apparently widely different embodiments of this invention may be made without departing from the spirit thereof, it will be understood that I do not intend to limit myself to the specific embodiment herein set forth except as indicated in the appended claims.

Each of the substances enumerated herein as members of the various species has been employed in the vulcanization of rubber and has been found to accomplish vulcanization as indicated.

Having thus described my invention, what I claim and desire to protect by Letters Patent is:

1. A process of vulcanizing rubber or similar material which comprises combining with the rubber a vulcanizing agent and an accelerator comprising the group

where M is a metal, and vulcanizing the rubber.

2. A process of vulcanizing rubber or similar material which comprises combining with the rubber a vulcanizing agent and an accelerator comprising the group

and vulcanizing the rubber.

3. A process of vulcanizing rubber or similar material which comprises combining with the rubber a vulcanizing agent and an accelerator comprising the group

where M is a metal, and vulcanizing the rubber at a temperature below the normal hot vulcanizing temperature.

4. A process of vulcanizing rubber or similar material which comprises combining with the rubber a vulcanizing agent and an accelerator comprising the group

and vulcanizing the rubber at a temperature below the normal hot vulcanizing temperature.

5. A process of vulcanizing rubber or similar material which comprises combining with the rubber a vulcanizing agent and an accelerator comprising the radical $$\overset{OCSM}{\underset{X}{\|}}$$

where M is a metal, and vulcanizing the rubber.

6. A process of vulcanizing rubber or similar material which comprises combining the rubber with a vulcanizing agent and an accelerator comprising the radical $$\overset{OCSM'}{\underset{X}{\|}},$$

and vulcanizing the rubber.

7. A process of vulcanizing rubber or similar material which comprises combining the rubber with a vulcanizing agent and an accelerator comprising the radical $$\overset{OCSM'}{\underset{X}{\|}},$$

and vulcanizing the rubber at a temperature below the normal hot vulcanizing temperature.

8. A process of vulcanizing rubber or similar material which comprises combining with the rubber sulphur and an accelerator comprising the group $$\overset{R'CSM,}{\underset{X}{\|}}$$

where M is a metal, in the presence of a combined metal M', and vulcanizing the rubber.

9. A process of vulcanizing rubber or similar material which comprises combining with the rubber sulphur and an accelerator comprising the group $$\overset{R'CSM',}{\underset{X}{\|}}$$

and vulcanizing the rubber.

10. A process of vulcanizing rubber or similar material which comprises combining with the rubber sulphur and an accelerator comprising the radical $$\overset{OCSM',}{\underset{X}{\|}}$$

and vulcanizing the rubber at a temperature below the normal hot vulcanizing temperature.

11. The process of treating rubber or similar material which comprises combining it with a vulcanizing agent, an amine and a metallic xanthogenate, and vulcanizing the rubber.

12. The process of treating rubber or similar material, comprising combining it with sulphur, a metallic xanthogenate, and an amine, and vulcanizing the rubber.

13. The process of treating rubber or similar material comprising combining it with a vulcanizing agent and a metallic xanthogenate, and vulcanizing the rubber at a temperature below the normal hot vulcanization temperature.

14. The process of treating rubber or similar material, comprising combining it with a vulcanizing agent, a metallic xanthogenate, and an amine, and vulcanizing the rubber at a temperature below the normal hot vulcanization temperature.

15. A vulcanized rubber derived from rubber combined with sulphur, a metallic butyl xanthogenate, an amine, and zinc oxide.

16. A vulcanized rubber derived from rubber or similar material combined with a vulcanizing agent and an accelerator comprising the group $$\overset{R'CSM,}{\underset{X}{\|}}$$

where M is a metal.

17. A vulcanized rubber derived from rubber or similar material combined with a vulcanizing agent and an accelerator comprising the group $$\overset{RCSM',}{\underset{X}{\|}}$$

18. A rubber vulcanized at a temperature below the normal hot vulcanizing temperature derived from rubber or similar material combined with a vulcanizing agent and an accelerator comprising the group $$\overset{R'CSM,}{\|}$$

where M is a metal.

19. A rubber vulcanized at a temperature below the normal hot vulcanizing temperature derived from rubber or similar material combined with a vulcanizing agent and an accelerator comprising the group $$\overset{RCSM'.}{\underset{X}{\|}}$$

20. A vulcanized rubber derived from rubber or similar material combined with a vulcanizing agent and an accelerator comprising the radical $$\overset{OCSM}{\underset{X}{\|}}$$

where M is a metal.

21. A vulcanized rubber derived from rubber or similar material combined with a vulcanizing agent and an accelerator comprising the radical $$\overset{OCSM'.}{\underset{X}{\|}}$$

22. A vulcanized rubber derived from rubber or similar material combined with sulphur and an accelerator comprising the group $$\overset{R'CSM,}{\underset{X}{\|}}$$

where M is a metal, in the presence of a combined metal M'.

23. A rubber vulcanized at a temperature below the normal hot vulcanizing temperature derived from rubber or similar material combined with a vulcanizing agent and an accelerator comprising the radical $$\overset{OCSM'.}{\underset{X}{\|}}$$

24. A vulcanized rubber derived from rubber or similar material combined with sulphur and an accelerator comprising the group $$\overset{R'CSM'.}{\|}$$

25. The step in the process of vulcanizing rubber comprising combining it with a metallic butyl xanthogenate.

26. The step in the process of vulcanizing rubber at low temperatures comprising combining it with a metallic butyl xanthogenate.

27. The process of vulcanizing rubber comprising combining it with sulphur, a metallic butyl xanthogenate, and zinc in combination.

28. The process of vulcanizing rubber which comprises combining it with sulphur, metallic butyl xanthogenate, and zinc in combination, and vulcanizing it at approximately 70° F.

29. The process of vulcanizing rubber at a temperature below the normal hot vulcanization temperatures comprising combining it with sulphur, zinc butyl xanthogenate, and zinc in combination.

30. The process of vulcanizing rubber at a temperature below the normal hot vulcanization temperatures comprising combining it with sulphur, zinc butyl xanthogenate, paratoluidine, and zinc oxide.

31. The process of vulcanizing rubber at a temperature below the normal hot vulcanization temperatures comprising combining it with sulphur, a metallic butyl xanthogenate, an amine, and a metallic oxide.

32. The process of vulcanizing rubber at a temperature below the normal hot vulcanization temperatures comprising combining it with sulphur, zinc butyl xanthogenate, an amine, and zinc in combination.

33. The process of vulcanizing rubber comprising combining it with sulphur, a metallic butyl xanthogenate, an amine, and zinc oxide.

34. The step in the process of vulcanizing rubber comprising combining it with a metallic salt of the reaction product of carbon bisulphide, caustic alkali, and butyl alcohol.

35. The step in the process of vulcanizing rubber at low temperature comprising combining it with the zinc salt of the reaction product of carbon bisulphide, potassium hydroxide, and butyl alcohol.

36. A vulcanized rubber-like material derived from rubber or similar material combined with a metallic xanthogenate and an amine.

37. A vulcanized rubber derived from rubber or similar material combined with sulphur, and amine and a metallic xanthogenate.

38. A vulcanized rubber derived from rubber or similar material combined with a vulcanizing agent, a metallic xanthogenate, and an amine.

39. A rubber vulcanized at a temperature below the normal hot vulcanization temperature, derived from rubber or similar material combined with a vulcanizing agent and a metallic xanthogenate.

40. A rubber vulcanized at a temperature below the normal hot vulcanization temperature, derived from rubber or similar material combined with a vulcanizing agent, a metallic xanthogenate, and an amine.

41. A rubber vulcanized at a temperature below the normal hot vulcanization temperatures, derived from rubber combined with sulphur, a metallic butyl xanthogenate, and zinc oxide.

42. A rubber vulcanized at a temperature below the normal hot vulcanization temperatures, derived from rubber combined with sulphur, zinc butyl xanthogenate, and zinc oxide.

43. A rubber vulcanized at a temperature below the normal hot vulcanization temperatures, derived from rubber combined with sulphur, zinc butyl xanthogenate, paratoluidine, and zinc oxide.

44. A rubber vulcanized at a temperature below the normal hot vulcanization temperatures, derived from rubber combined with sulphur, a metallic butyl xanthogenate, an amine, and a metallic oxide.

45. A rubber vulcanized at a temperature below the normal hot vulcanization temperatures, derived from rubber combined with sulphur, zinc butyl xanthogenate, an amine, and zinc oxide.

46. A rubber vulcanized at a temperature below the normal hot vulcanizing temperature derived from rubber or similar material combined with sulphur and an accelerator comprising the radical $$\overset{OCSM'.}{\underset{S}{\|}}$$

47. The process of accelerating the vulcanization of a composition containing rubber or the like and an agent of vulcanization, which comprises vulcanizing the composition together with a vulcanization accelerator which is a carbon bisulphide addition product of butyl alcohol.

48. The process of accelerating the vulcanization of a composition containing a plastic gum and a vulcanizing agent, which comprises vulcanizing the composition together with a metallic salt of butyl xanthogenate.

49. The process of accelerating the vulcanization of a rubber composition which comprises vulcanizing the composition together with a zinc butyl xanthogenate vulcanization accelerator.

50. The process of manufacturing a low-temperature vulcanizing composition which comprises milling together rubber, sulphur, and a metal normal-butyl xanthogenate.

Signed at New York, New York, this 30th day of March, 1922.

SIDNEY M. CADWELL.

Certificate of Correction.

Patent No. 1,440,963. Granted January 2, 1923, to

SIDNEY M. CADWELL.

It is hereby certified that error appears in the printed specification of the above-numbered patent requiring correction as follows: Page 1, lines 59 and 60, strike out the formula and insert instead

page 2, lines 22 and 23, strike out the formula and insert

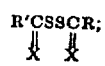

page 3, in the table Group III, species 40, strike out the formula and insert instead

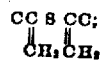

page 4, line 18, after the word "vulcanization" insert the words *with heat*, and line 24, strike out the words "with heat"; same page, line 68, for the word "at" read *as;* page 5, lines 119 to 123, strike out the formula and insert instead

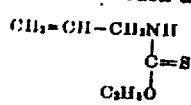

page 6, lines 21 to 23, strike out the formula and insert

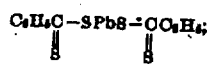

same page, lines 82 to 87, strike out the two formulas and insert instead

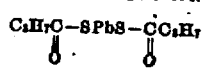

*Species 7.*

page 7, lines 83 to 85, strike out the formula and insert

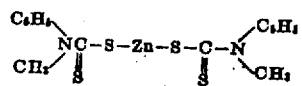

page 5, line 73; page 7, lines 88, 91, 95, 100, 105, 109 and 126, and page 8, lines 3, 8, 13, 18, 22, and 33, in the formulas insert a diagonal dash between the subscript numerals, and the symbols for the metals of the compounds; page 9, line 104, claim 18, in the formula insert an *x* below the double bond; page 10, line 23, claim 24, in the formula insert an *x* below the double bond; and that the said Letters Patent should be read with these corrections therein that the same may conform to the record of the case in the Patent Office.

Signed and sealed this 24th day of July, A. D. 1928.

[SEAL.]

WM. A. KINNAN,
*Acting Commissioner of Patents.*